(12) United States Patent
Bose et al.

(10) Patent No.: US 8,890,825 B2
(45) Date of Patent: Nov. 18, 2014

(54) APPARATUS AND METHOD FOR DETERMINING THE POSITION OF USER INPUT

(75) Inventors: Raja Bose, Mountain View, CA (US); Jonathan Lester, San Francisco, CA (US); Jorg Brakensiek, Mountain View, CA (US)

(73) Assignee: Nokia Corporation, Espoo (FI)

( * ) Notice: Subject to any disclaimer, the term of this patent is extended or adjusted under 35 U.S.C. 154(b) by 297 days.

(21) Appl. No.: 13/400,440

(22) Filed: Feb. 20, 2012

(65) Prior Publication Data

US 2013/0215040 A1 Aug. 22, 2013

(51) Int. Cl.
*G06F 3/041* (2006.01)

(52) U.S. Cl.
USPC .......................................... 345/173; 715/863

(58) Field of Classification Search
CPC ... G06F 3/0414; G06F 3/045; G06F 3/04883; G06F 2203/04105; G06F 2203/04106; H03K 17/9625
USPC ...................... 345/173–178; 178/18.01–20.04
See application file for complete search history.

(56) References Cited

U.S. PATENT DOCUMENTS

| | | |
|---|---|---|
| 2005/0289476 A1 | 12/2005 | Tokkonen |
| 2006/0238517 A1 | 10/2006 | King et al. |
| 2008/0238884 A1 | 10/2008 | Harish |
| 2009/0278806 A1 | 11/2009 | Duarte et al. |
| 2010/0134424 A1 | 6/2010 | Brisebois et al. |
| 2010/0156656 A1 | 6/2010 | Duarte et al. |
| 2010/0302172 A1 | 12/2010 | Wilairat |
| 2011/0157029 A1 | 6/2011 | Tseng |
| 2011/0209097 A1 | 8/2011 | Hinckley et al. |
| 2012/0056836 A1* | 3/2012 | Cha et al. ...................... 345/173 |
| 2013/0154959 A1* | 6/2013 | Lindsay et al. ............... 345/173 |

FOREIGN PATENT DOCUMENTS

| | | |
|---|---|---|
| EP | 2 214 085 A2 | 8/2010 |
| EP | 2 320 308 A1 | 5/2011 |
| WO | WO 2009/130381 A1 | 10/2009 |
| WO | WO 2010/058301 A2 | 5/2010 |

OTHER PUBLICATIONS

International Search Report and Written Opinion for Application No. PCT/FI2013/050086 dated Mar. 25, 2013.
Roth, V. et al., *Bezel Swipe: Conflict-free Scrolling and Multiple Selection on Mobile Touch Screen Devices*, Multimodal Mobile Interaction CHI (2009) pp. 1523-1526.

(Continued)

*Primary Examiner* — Sumati Lefkowitz
*Assistant Examiner* — Robin Mak
(74) *Attorney, Agent, or Firm* — Alston & Bird LLP

(57) ABSTRACT

An apparatus, method, and computer program product are described that determine a position of a touch component of a user input received outside a touch sensitive area of a touch surface by correlating a position of the force component and a position of a touch component of a portion of the user input received within the touch sensitive area with a position of the force component of a portion of the user input received outside the touch sensitive area. In this way, the position of a touch component of the user input received outside the touch sensitive area, where the touch surface is not capable via hardware to detect the position of the touch component, may be determined, and operations may be executed based on the position of the touch component that is determined.

21 Claims, 14 Drawing Sheets

(56) References Cited

OTHER PUBLICATIONS

Melchiorri, Claudio; "Slip Detection and Control Using Tactile and Force Sensors"; IEEE/ASME Transactions on Mechatronics, vol. 5, No. 3; Sep. 2000; pp. 235-243.

Clarkson, Edward C., et al.; "Exploring Continuous Pressure Input for Mobile Phones"; Downloaded at http://abstract.cs.washington.edu/~shwetak/papers/uist-pressure.pdf on Jun. 21, 2012; 4 pages.

Nokia N9 UX Guidelines; Downloaded at http://harmattan-dev.nokia.com/docs/ux/pages/The_Swipe.html on Jun. 21, 2012; 2 pages.

* cited by examiner

APPARATUS AND METHOD FOR DETERMINING THE POSITION OF USER INPUT

TECHNOLOGICAL FIELD

Embodiments of the present invention relate generally to determining the position of a touch component of a user input using positional information relating to a force component of the input.

BACKGROUND

Advancements in mobile device technology have provided mobile devices, such as cellular telephones and portable digital assistants (PDAs), that have increased functionality and allow users to enter and access information in a variety of ways. For example, touch screen displays configured to receive user input through direct interaction with the user's finger or an implement held by the user, such as a stylus, have become a popular feature of mobile devices.

Through interaction with a touch screen display or other touch surface, a user can apply various touch gestures to the touch surface to select and manipulate content in an intuitive fashion. Based on the type of user input (e.g., the particular touch gesture that is applied), where it is applied, and/or how it is applied, the user device can determine which operation to execute.

Accordingly, it may be desirable to provide an improved mechanism for receiving user input so as to maximize the ease of use and functionality of the user interface of user's device.

BRIEF SUMMARY OF EXAMPLE EMBODIMENTS

Accordingly, embodiments of an apparatus, method, and computer program product are described that can determine the position of a touch component of user input based on positional information relating to a force component of the user input. In particular, embodiments of an apparatus for determining the position of a touch component of user input may include at least one processor and at least one memory including computer program code. The at least one memory and the computer program code may be configured to, with the processor, cause the apparatus to receive a user input comprising a touch component and a force component, where a first portion of the user input is at least partially received outside a touch sensitive area and a second portion of the user input is at least partially received within the touch sensitive area. The at least one memory and the computer program code may be further configured to, with the processor, cause the apparatus to determine a position of the force component of the first portion of the user input, determine a position of the touch component and the force component of the second portion of the user input, correlate the position of the force component and the position of the touch component of the second portion of the user input with the position of the force component of the first portion of the user input to determine a position of the touch component of the first portion of the user input, and provide for execution of an operation based on at least the position of the touch component of the first portion of the user input that is determined.

In some cases, an initial position of the touch component of the user input may be outside the touch sensitive area, and a terminal position of the touch component of the user input may be within the touch sensitive area, whereas in other cases an initial position of the touch component of the user input may be within the touch sensitive area and a terminal position of the touch component of the user input may be outside the touch sensitive area. The touch sensitive area may correspond to an active display area.

The at least one memory and the computer program code may be configured to, with the processor, cause the apparatus to determine a position of the touch component and the force component along an entire length of the second portion of the user input. In some embodiments, the at least one memory and the computer program code may be further configured to, with the processor, cause the apparatus to provide for execution of the operation based on detection of the position of the force component of the first portion of the user input and based on the absence of detection of the position of the touch component of the first portion of the user input. Furthermore, in some cases, a third portion of the user input may be at least partially received within the touch sensitive area or outside the touch sensitive area.

In other embodiments, a method and a computer program product are described for determining the position of a touch component of user input by receiving a user input comprising a touch component and a force component, where a first portion of the user input is at least partially received outside a touch sensitive area and a second portion of the user input is at least partially received within the touch sensitive area; determining a position of the force component of the first portion of the user input; determining a position of the touch component and the force component of the second portion of the user input; correlating the position of the force component and the position of the touch component of the second portion of the user input with the position of the force component of the first portion of the user input to determine a position of the touch component of the first portion of the user input; and providing for execution of an operation based on at least the position of the touch component of the first portion of the user input that is determined.

In some cases, an initial position of the touch component of the user input may be outside the touch sensitive area, and a terminal position of the touch component of the user input may be within the touch sensitive area. In other cases, an initial position of the touch component of the user input may be within the touch sensitive area, and a terminal position of the touch component of the user input may be outside the touch sensitive area. The touch sensitive area may correspond to an active display area.

In some embodiments, determining a position of the touch component and the force component of the second portion of the user input may comprise determining a position of the touch component and the force component along an entire length of the second portion of the user input. Execution of the operation may be provided for based on detection of the position of the force component of the first portion of the user input and based on the absence of detection of the position of the touch component of the first portion of the user input. In addition, a third portion of the user input may be at least partially received within the touch sensitive area or outside the touch sensitive area.

In still other embodiments, an apparatus is described for determining the position of a touch component of user input. The apparatus may include means for determining the position of a touch component of user input by receiving a user input comprising a touch component and a force component, where a first portion of the user input is at least partially received outside a touch sensitive area and a second portion of the user input is at least partially received within the touch sensitive area; means for determining a position of the force component of the first portion of the user input; means for determining a position of the touch component and the force component of the second portion of the user input; means for correlating the position of the force component and the position of the touch component of the second portion of the user input with the position of the force component of the first portion of the user input to determine a position of the touch component of the first portion of the user input; and means for providing for execution of an operation based on at least the position of the touch component of the first portion of the user input that is determined.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4A illustrates a close-up view of the user input of FIG. 4, including a first portion and a second portion;

Figure 10:
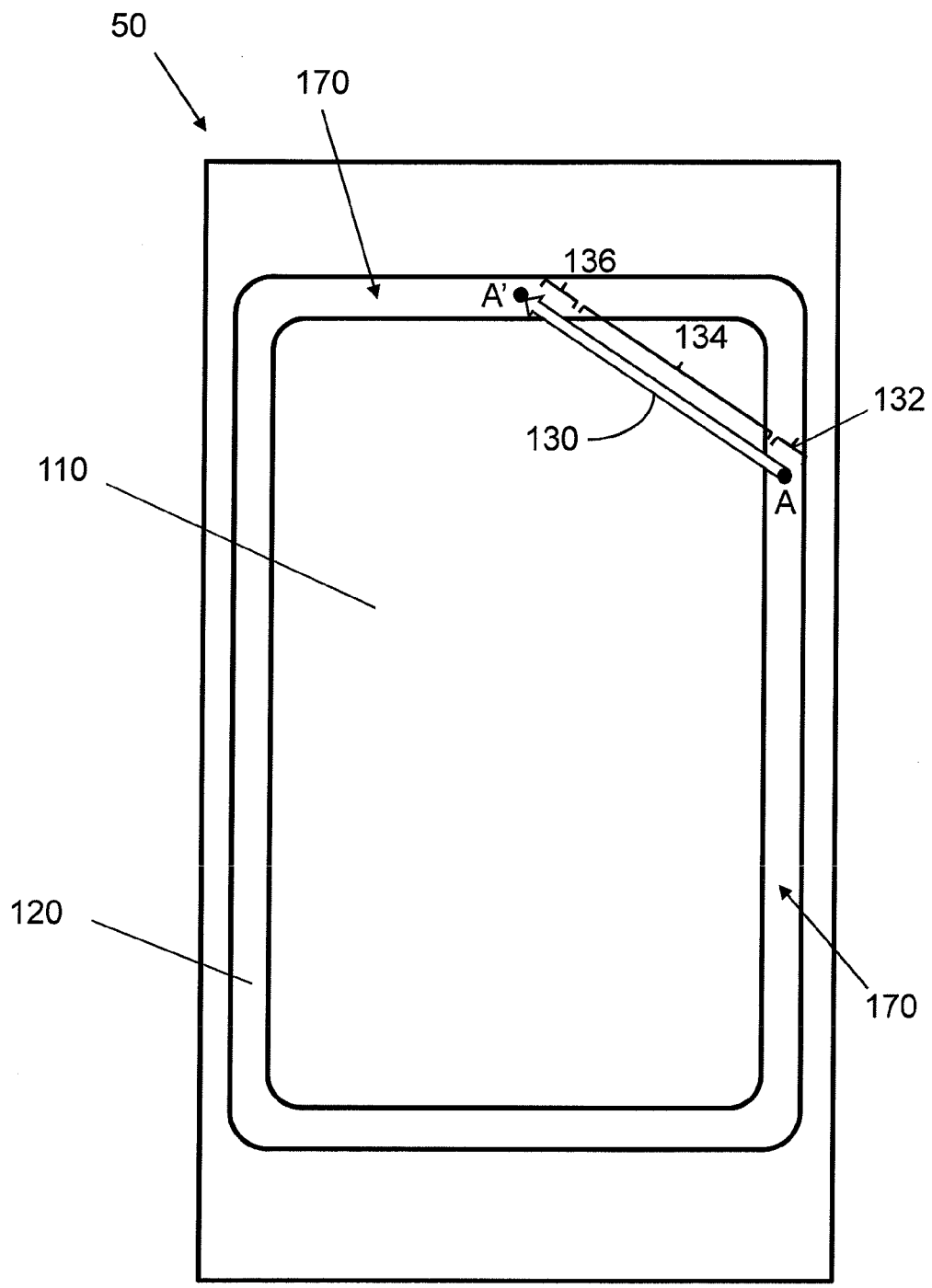
Figure 11:
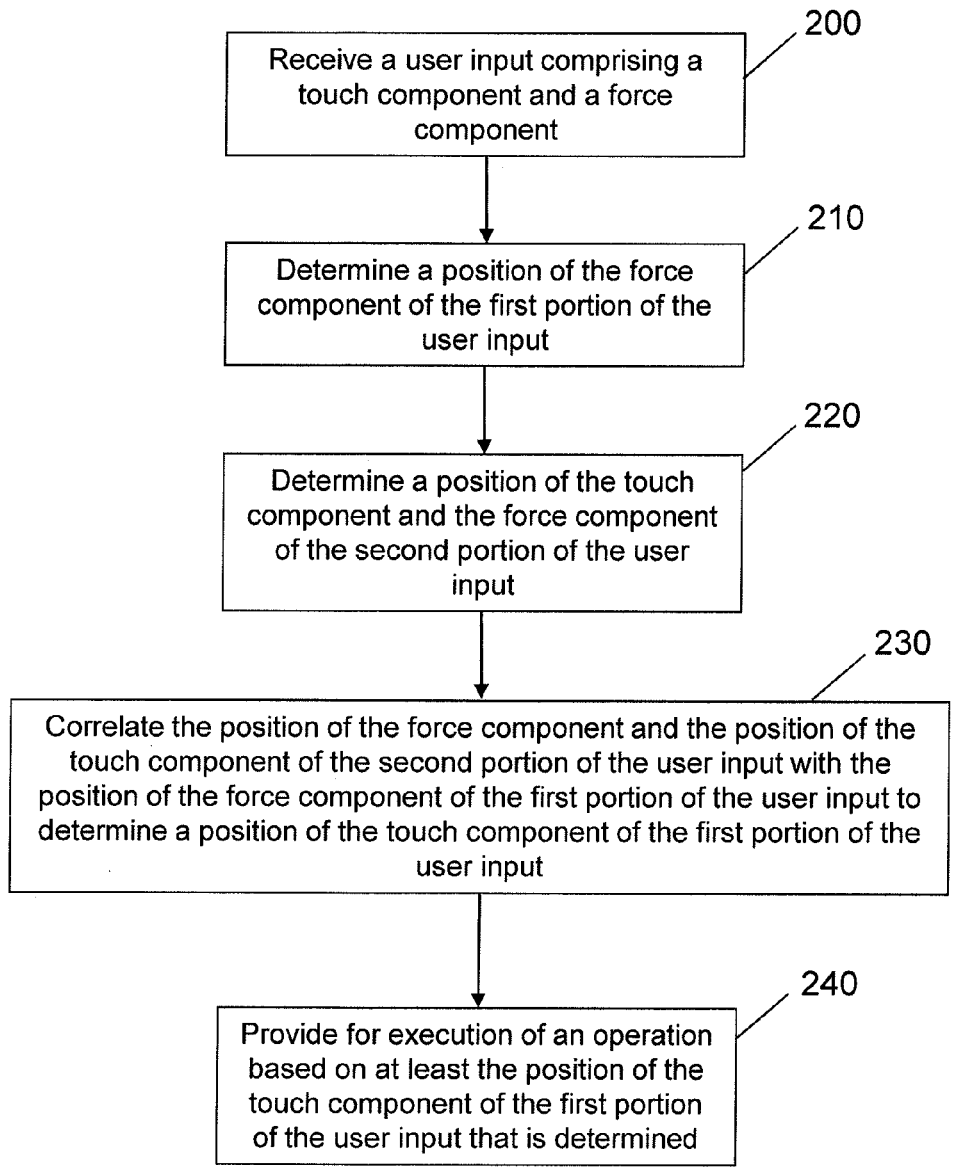

FIG. 10 illustrates a user input having a first portion that is received outside a touch sensitive area, a second portion that is received within the touch sensitive area, and a third portion that is received outside the touch sensitive area according to an example embodiment of the present invention; and FIG. 11 illustrates a flowchart of a method of determining a position of a touch component of a user input according to another example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

Modern mobile devices are configured to receive various types of user inputs and to execute operations based on different aspects or components of the input. For example, some user devices, such as cellular telephones, are equipped with touch screen displays that are capable of receiving user inputs in the form of touch gestures applied directly to the display (e.g., through contact between the user's finger or an object being held by the user and the display) rather than through the use of an input device, such as a keyboard or a mouse. Other user devices may rely on a user input device, such as a touchpad, that is separate from the display of the device, but is similarly configured to receive the user's input through contact with the user's finger or some other object.

Different types of sensors may be provided on or below the surface receiving the input (e.g., the touch screen display or the touchpad) to detect different components of the input. Such sensors may include capacitive sensors, heat sensors, or optical sensors for detecting a touch component of the input and/or force sensors for detecting a force component of the input, as described in greater detail below.

In some cases, only part of the touch surface (e.g., the touch screen display or the touchpad, in the examples above) receiving the input may be equipped to detect a touch component of the input, whereas information regarding the force component of the input may be gathered regardless of where on the touch surface the input is received. Unlike information regarding the touch component, information regarding the force component may not provide the device with an accurate determination of the position at which the input is received. Positional information may be important in some cases, as the operation to be executed by the device may be determined, at least in part, on the location at which the user input was received.

For example, a touch surface may include a touch sensitive area configured to detect the position of a user's touch gesture and a region outside the touch sensitive area (e.g., bordering the touch sensitive area) that, although configured to receive user input, is not equipped with touch sensitive capabilities. Thus, although contact with the region outside the touch sensitive area may be registered as a user input due to detection of the force component of the input in those areas, the position of the touch component of the input may not be available.

In user devices that are configured to recognize certain user inputs as invoking the execution of particular operations based on where and how the inputs are received on the touch screen display, it may be important to have information regarding the position of the input outside the touch sensitive area, as well as within the touch sensitive area, to allow the device to determine which operation to execute. For example, a "swipe-in" touch gesture may be recognized where the user initiates the input at an edge of the touch sensitive area (e.g., in the region bordering the touch sensitive area) and moves his finger towards the center of the touch sensitive area. A "swipe-in" gesture may, for example, cause the device to transition between different screens of interactive content, such as to switch from displaying a particular application to displaying the device's home screen.

In some cases, however, a user input that is not intended to be a "swipe-in" gesture may be registered as a "swipe-in" gesture and may, thus, invoke the execution of an unintended operation. For example, if a user is applying an input to the touch surface to scroll down a page of displayed content or to pan the screen, the scroll or pan gesture may incorrectly be interpreted as a "swipe-in" or "swipe-up" gesture if the gesture is received close to the edge of the touch sensitive area and may thus invoke the execution of an unintended operation, such as the closing of an application or the transition from one screen to another.

Accordingly, embodiments of the present invention correlate the position of a force component and the position of a touch component of a portion of a user input received in a touch sensitive area of a touch surface with the position of a force component of another portion of the user input received outside the touch sensitive area to determine the position of the touch component in areas of the touch surface outside the touch sensitive area. In other words, using positional information derived from receipt of the force component of the user input across the whole touch surface as well positional information based on receipt of the touch component in areas of the touch surface that are capable of detecting a touch component, a position of the touch component in areas of the touch surface that are not configured to detect the touch component may be determined and used to execute certain predetermined operations, as described in greater detail below.

Figure 1:
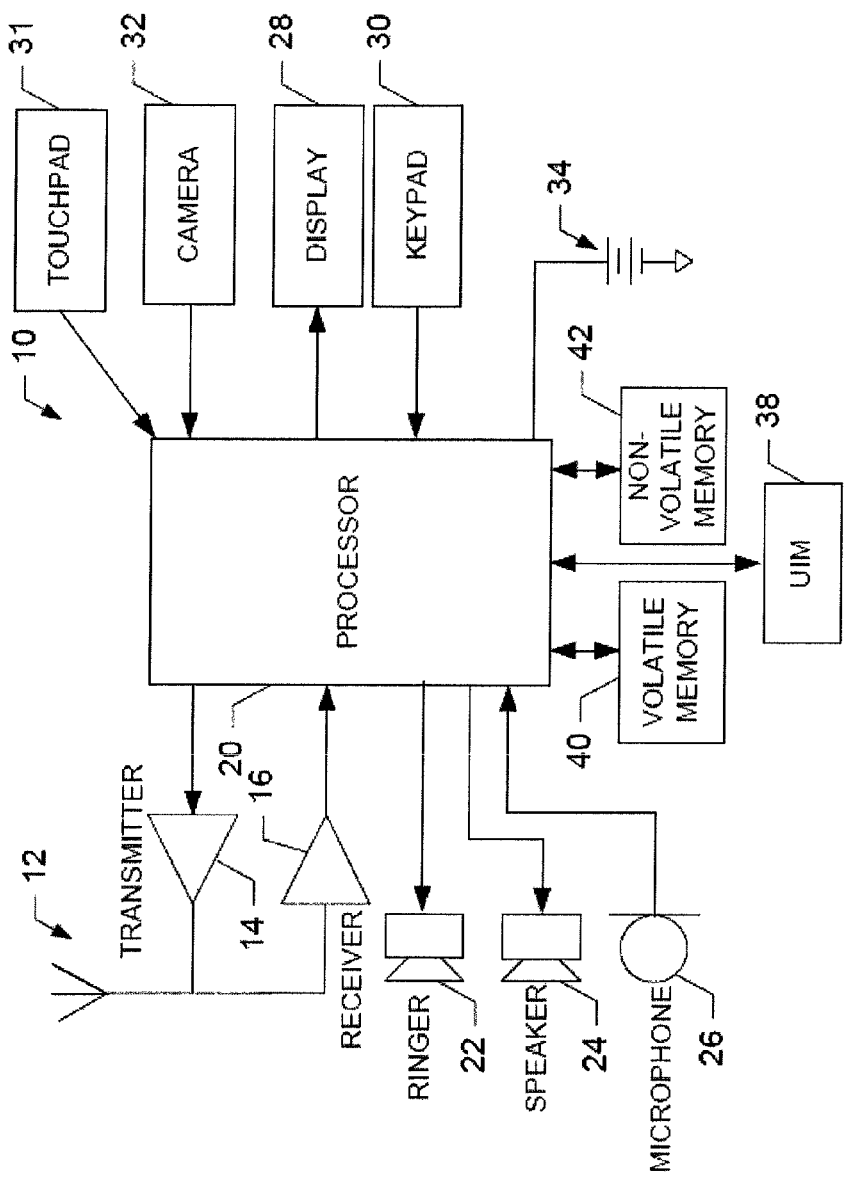
FIG. 1 illustrates one example of a communication system according to an example embodiment of the present invention.

FIG. 1, which provides one example embodiment, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include a proximity component and/or an orientation component, as described below. The signals may further include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch screen display (display 28 providing an example of such a touch screen display), a touchpad 31, or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch screen display, as described further below, may omit the keypad 30 or touchpad 31 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element 32 in order to capture images or video of objects, people, and places proximate to the user of the mobile terminal 10. The mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, which depicts certain elements of an apparatus 50 for determining a position of a touch component of a user input received outside a touch sensitive area. The apparatus 50 of FIG. 2 may be employed, for example, in conjunction with the mobile terminal 10 of FIG. 1. However, it should be noted that the apparatus 50 of FIG. 2 may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer, a tablet, a mobile telephone, or other user terminal. Moreover, in some cases, the apparatus 50 may be on a fixed device such as server or other service platform and the content may be presented (e.g., via a server/client relationship) on a remote device such as a user terminal (e.g., the mobile terminal 10) based on processing that occurs at the fixed device.

Figure 2:
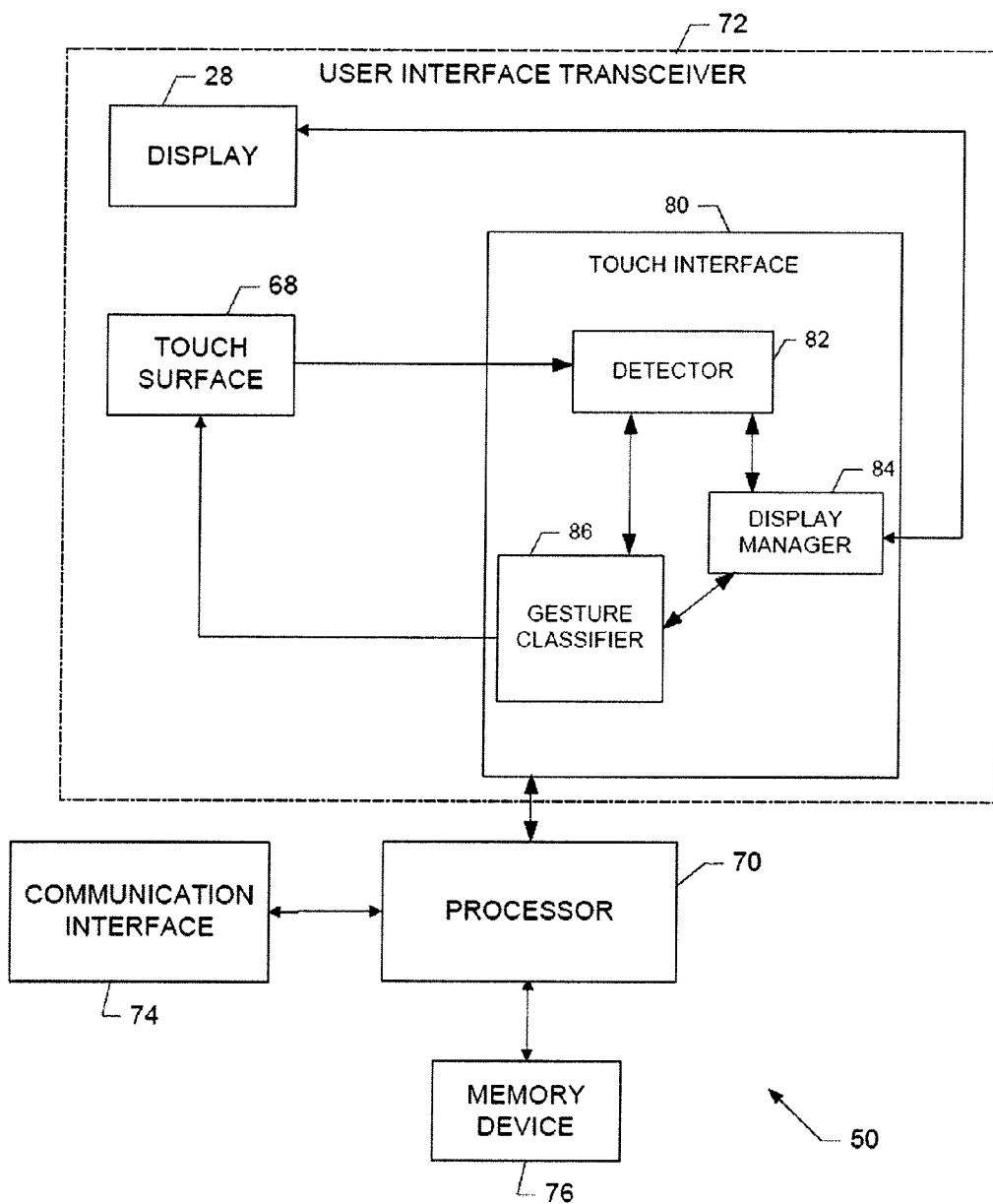
FIG. 2 illustrates a schematic block diagram of an apparatus for determining a position of a touch component of a user input according to an example embodiment of the present invention.

It should also be noted that while FIG. 2 illustrates one example of a configuration of an apparatus for determining a position of a touch component, numerous other configurations may also be used to implement embodiments of the present invention. As such, in some embodiments, although devices or elements are shown as being in communication with each other, hereinafter such devices or elements should be considered to be capable of being embodied within a same device or element and, thus, devices or elements shown in communication should be understood to alternatively be portions of the same device or element.

Referring now to FIG. 2, the apparatus 50 for determining a position of a touch component of a user input received outside a touch sensitive area may include or otherwise be in communication with a processor 70, a user interface transceiver 72, a communication interface 74, and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, content, applications, instructions, or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface transceiver 72 may be in communication with the processor 70 to receive an indication of a user input and/or to cause provision of an audible, visual, mechanical or other output to the user. As such, the user interface transceiver 72 may include, for example, a keyboard, a mouse, a touchpad, a joystick, a display, a touch screen(s), touch areas, soft keys, a microphone, a speaker, or other input/output mechanisms. Alternatively or additionally, the processor 70 may comprise user interface circuitry configured to control at least some functions of one or more user interface elements such as, for example, a speaker, ringer, microphone, display, and/or the like. The processor 70 and/or user interface circuitry comprising the processor 70 may be configured to control one or more functions of one or more user interface elements through computer program instructions (e.g., software and/or firmware) stored on a memory accessible to the processor 70 (e.g., memory device 76, and/or the like).

In an example embodiment, the apparatus 50 may include or otherwise be in communication with a touch surface 68, which may be embodied by a touch screen display (e.g., the display 28) or a touchpad 31 (FIG. 1), for example. In embodiments in which the touch surface 68 is embodied by a touch screen display 28, the touch screen display may be a two dimensional (2D) or three dimensional (3D) display that is configured to receive user input through contact with or proximity of the user's finger or an object held by the user (such as a stylus). Similarly, in embodiments in which the touch surface 68 is embodied by a touchpad 31, the touchpad may be configured to receive input from a user via contact with the user's finger or an object held by the user, such that the user's finger or object in many ways acts as the "mouse."

The touch surface 68 may be embodied as any known touch surface. Thus, for example, the touch surface 68 could be configured to enable touch recognition by any suitable technique, such as resistive, capacitive, infrared, strain gauge, surface wave, optical imaging, dispersive signal technology, acoustic pulse recognition, and/or other techniques, depending on whether the touch surface is a touch screen display or a touchpad and the particular configuration of the device. The user interface transceiver 72 may be in communication with the touch surface 68 to receive touch inputs at the touch surface 68 and to analyze and/or modify a response to such indications based on corresponding user actions that may be inferred or otherwise determined responsive to the touch inputs.

With continued reference to FIG. 2, in an example embodiment, the apparatus 50 may include a touch interface 80. The touch interface 80 may, in some instances, be a portion of the user interface transceiver 72. However, in some alternative embodiments, the touch interface 80 may be embodied as the processor 70 or may be a separate entity controlled by the processor 70. As such, in some embodiments, the processor 70 may be said to cause, direct or control the execution or occurrence of the various functions attributed to the touch interface 80 (and any components of the touch interface 80) as described herein. The touch interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the touch interface 80 as described herein. Thus, in examples in which software is employed, a device or circuitry (e.g., the processor 70 in one example) executing the software forms the structure associated with such means.

The touch interface 80 may be configured to receive an input in the form of a touch event at the touch surface 68 (e.g., the touch screen display or the touchpad). As such, the touch interface 80 may be in communication with the touch surface 68 to receive user inputs at the touch surface 68 and to modify a response to such inputs based on corresponding user actions that may be inferred or otherwise determined responsive to the inputs. Following recognition of a touch event, the touch interface 80 may be configured to determine a classification of the touch event and provide a corresponding function based on the touch event in some situations.

In some embodiments, the touch interface 80 may include a detector 82, a display manager 84, and a gesture classifier 86. Each of the detector 82, the display manager 84, and the gesture classifier 86 may be any device or means embodied in either hardware or a combination of hardware and software configured to perform the corresponding functions associated with the detector 82, the display manager 84, and the gesture classifier 86, respectively, as described herein. In an exemplary embodiment, each of the detector 82, the display manager 84, and the gesture classifier 86 may be controlled by or otherwise embodied as the processor 70.

The detector 82 may be in communication with the touch surface 68 to receive user inputs in order to recognize and/or determine a touch event based on each input received at the detector 82. A touch event may be defined as a detection of an object, such as a stylus, finger, pen, pencil, cellular telephone, digital camera, or any other mobile device (including the mobile terminal 10 shown in FIG. 1) or object, coming into contact with a portion of the touch surface in a manner sufficient to register as a touch. In this regard, for example, a touch event could be a detection of pressure on the screen of a touch screen display or on a touchpad above a particular pressure threshold over a given area. Subsequent to each touch event, the detector 82 may be further configured to pass along the data corresponding to the touch event (e.g., location of touch, length of touch, number of objects touching, touch pressure, touch area, speed of movement, direction of movement, length of delay, frequency of touch, etc.) to the gesture classifier 86 for gesture classification. As such, the detector 82 may include or be in communication with one or more force sensors configured to measure the amount of touch pressure (e.g., force over a given area) applied as a result of a touch event, as an example.

The gesture classifier 86 may be configured to recognize and/or determine a corresponding classification of a touch event. In other words, the gesture classifier 86 may be configured to perform gesture classification to classify the touch event as any of a number of possible gestures. Some examples of recognizable gestures may include a touch, multi-touch, stroke, character, symbol, shape, pinch event (e.g., a pinch in or pinch out), and/or the like.

Figure 3:
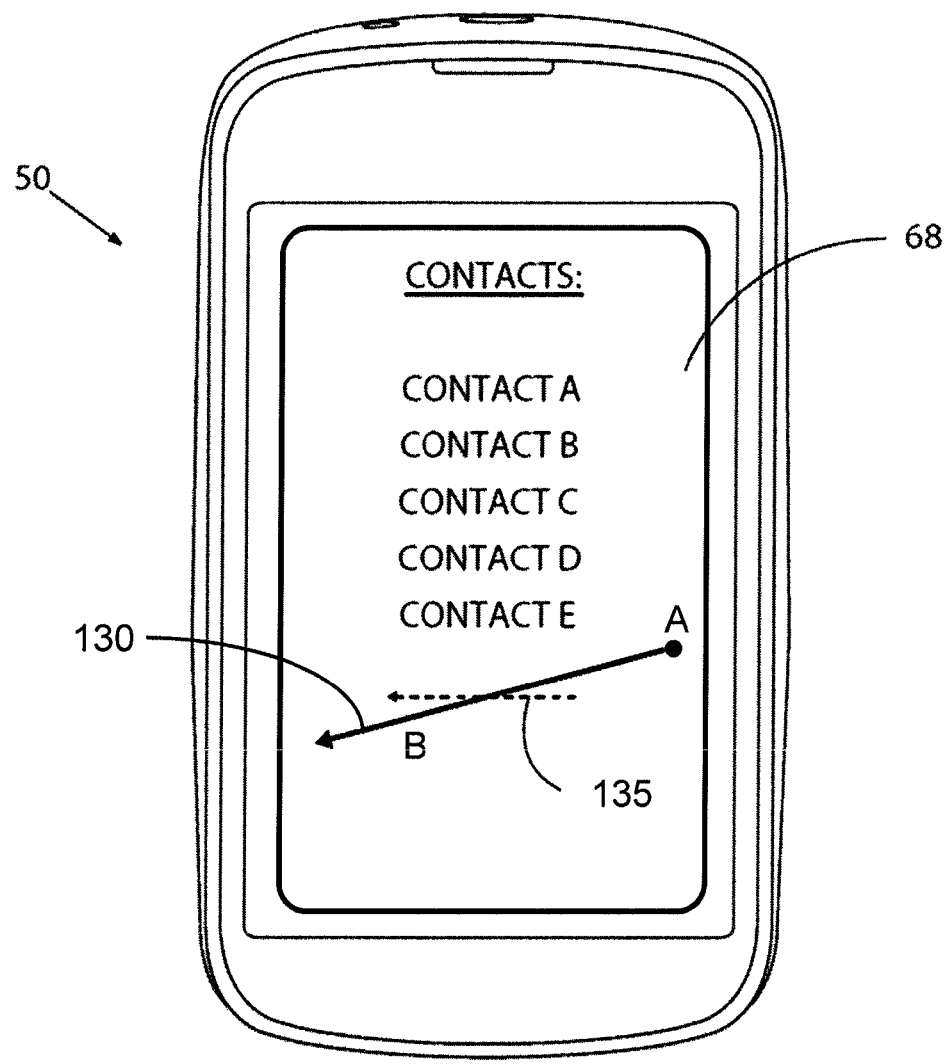
FIG. 3 illustrates a stroke gesture including a movement component according to an example embodiment of the present invention.

A touch may be defined as a touch event that impacts a single area (without or with minimal movement on the touch surface 68) and then is removed. A multi-touch may be defined as multiple touch events sensed concurrently (or nearly concurrently). A stroke may be defined as a touch event followed immediately by motion of the object initiating the touch event while the object remains in contact with the touch surface 68. In other words, the stroke may be defined by motion following a touch event thereby forming a continuous, moving touch event defining a moving series of instantaneous touch positions (e.g., as a drag operation or as a flick operation). As such, a stroke 130 (shown in FIG. 3) may include a contact component A (e.g., initial contact with the touch surface 68), a movement component B (e.g., motion of the object contacting the touch surface while the object remains in contact, represented by the arrow 130), with the direction of the movement component being the direction of motion of the object across the touch surface. In some cases, the direction may be a nominal direction that is not identical to the direction of the movement component (e.g., a direction that is not the actual or instantaneous direction of the movement of the object across the touch surface 68), as shown in FIG. 3 via the dashed arrow 135. Examples of a stroke include a "swipe-in" gesture, a "swipe-out" gesture, a "swipe-up" gesture, and a "swipe-down" gesture, as described in greater detail below. Multiple strokes and/or touches may be used to define a particular shape or sequence of shapes to define a character or symbol.

A pinch event may be classified as either a pinch out or a pinch in (hereinafter referred to simply as a pinch). A pinch may be defined as a multi-touch, where the touch events causing the multi-touch are spaced apart. After initial occurrence of the multi-touch event involving at least two objects, one or more of the objects may move substantially toward each other to simulate a pinch. Meanwhile, a pinch out may be defined as a multi-touch, where the touch events causing the multi-touch are relatively close together, followed by movement of the objects initiating the multi-touch substantially away from each other. In some cases, the objects on a pinch out may be so close together initially that they may be interpreted as a single touch, rather than a multi-touch, which then is modified by movement of two objects away from each other.

The gesture classifier 86 may also be configured to communicate detection information regarding the recognition, detection, and/or classification of a touch event to the display manager 84. The display manager 84 may be configured to provide control over modifications made to that which is presented on the display 28 (which, in some cases, is a touch screen display embodying the touch surface 68) based on the detection information received from the detector 82 and gesture classifications provided by the gesture classifier 86 in accordance with the responses prescribed for each respective gesture classification and implementation characteristic determined by the gesture classifier 86. In other words, the display manager 84 may configure the display 28 (e.g., with respect to the content displayed and/or the user interface effects presented relative to the content displayed) according to the gesture classification and implementation characteristic classification determined for a given touch event that may be detected at the display.

Figure 4:
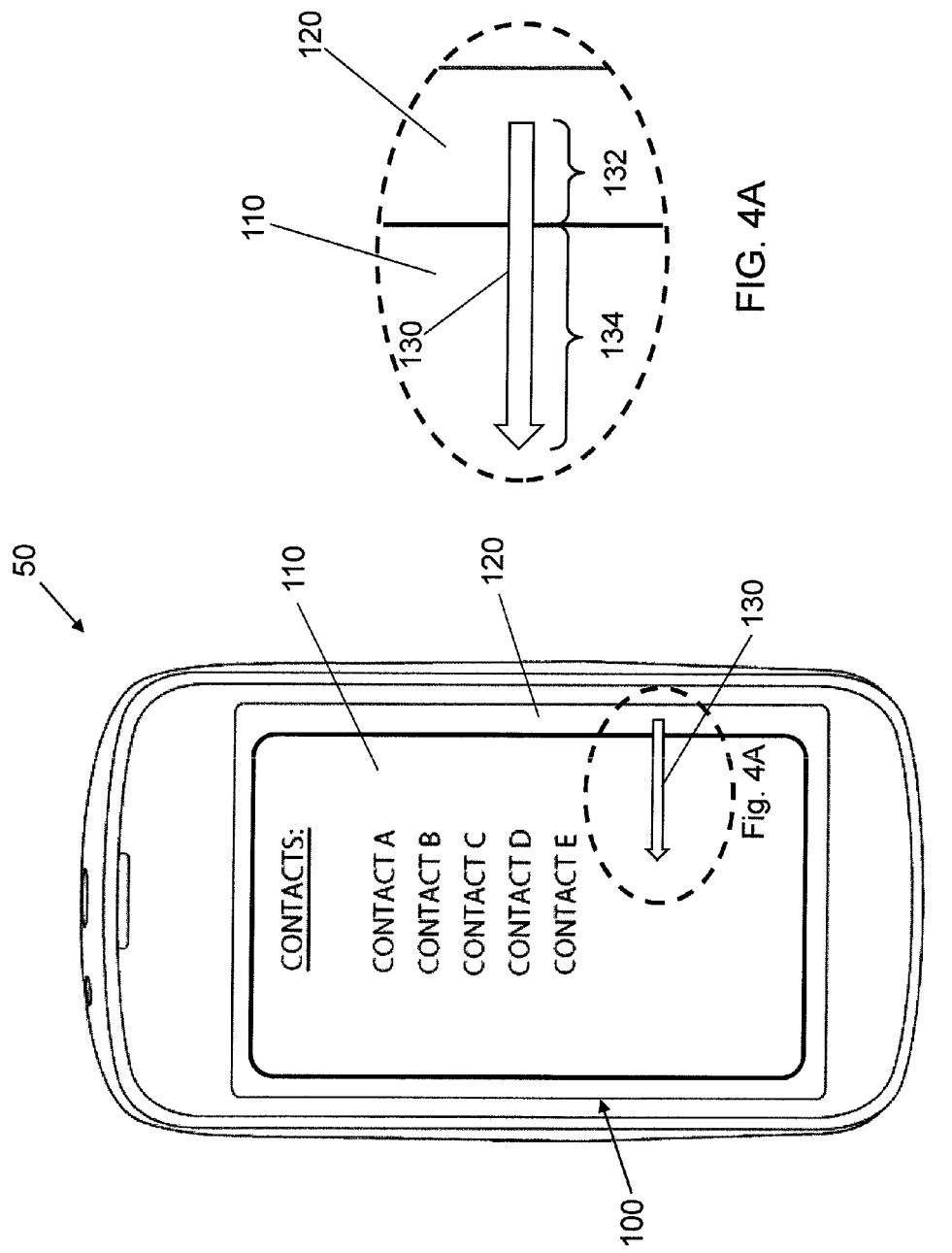
FIG. 4 illustrates a device configured to determine a position of a touch component of a user input applied to a touch surface according to an example embodiment of the present invention.

Turning now to FIG. 4, in general, an apparatus 50 is provided, such as an apparatus embodied by the mobile terminal 10 of FIG. 1 (e.g., a cellular phone), a laptop, or other device that has or is otherwise associated with a touch surface 68. For example, the cellular phone may be equipped with a touch screen display, or the laptop may be associated with a touchpad for receiving user inputs. In the description that follows, the example of a mobile device having a touch surface embodied by a touch screen display will be used for clarity and ease of explanation; however, it is understood that embodiments of the invention are applicable to other devices having other types of touch surfaces, such as devices configured to receive user inputs via a touchpad (e.g., touchpad 31 of FIG. 1).

As described above, the apparatus 50 may comprise at least one processor (e.g., processor 70 of FIG. 2) and at least one memory (e.g., memory device 76 of FIG. 2) including computer program code. The at least one memory and the computer program code may be configured to, with the processor, cause the apparatus 50 to at least receive a user input 130 comprising a touch component and a force component. With reference to FIGS. 4 and 4A, the user input may be applied across one or more areas of the touch screen display 100 and may thus include a movement component, as shown. For example, a first portion 132 of the user input 130 may be at least partially received outside a touch sensitive area 110 (e.g., in a boundary area 120), and a second portion of the user input 134 may be at least partially received within the touch sensitive area 110, as shown in FIG. 4A.

Figure 5:
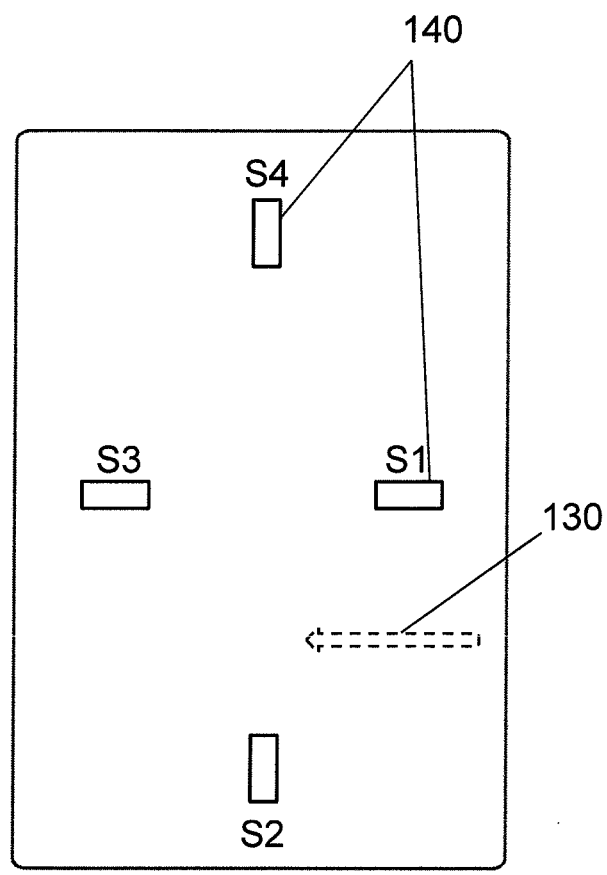
FIG. 5 illustrates a touch screen display with an outer surface of the display removed to show underlying force sensors according to an example embodiment of the present invention.

Turning to FIG. 5, the touch screen display 100 is shown with the outer surface of the display removed. Force sensors 140 may be provided behind the outer surface of the display that are configured to detect the force component of a user input 130 that is applied in either the touch sensitive area 110 or the boundary area 120 that is outside the touch sensitive area. For example, the force component of a user input 130 (shown in dashed lines in FIG. 5 to represent that it is applied to the outer surface of the display, which is not shown) may be detected by each of the four force sensors 140 provided in the depicted example, to a certain extent, based on the position of the user input with respect to the particular force sensor. In other words, as the user moves his finger (for example) across the outer surface of the touch screen display 100, each of the four depicted force sensors 140 may detect the force component (such as the amount of pressure applied by the finger at a given point along the path of the input) depending on how close the instantaneous touch component (contact of the user's finger with the display at that particular point along the path) is to the particular force sensor. Thus, for example, S1 and S2 may detect more of the force component that S3, and S3 may detect more of the force component than S4.

Based on the force component detected at each force sensor 140 as the user input 130 is applied to the touch screen display, a position of the force component may be calculated (e.g., by the processor 70 of FIG. 2). Accordingly, the at least one memory and the computer program code may be configured to, with the processor, cause the apparatus to determine a position of the force component of the first portion 132 (FIG. 4) of the user input 130, as well as the force component of the second portion 134 (FIG. 4) of the user input. In addition, the at least one memory and the computer program code may be configured to, with the processor, cause the apparatus to determine a position of the touch component of the second portion 134 (FIG. 4) of the user input 130 (e.g., within the touch sensitive area, where the touch screen display is equipped to detect the touch component).

Figure 6:
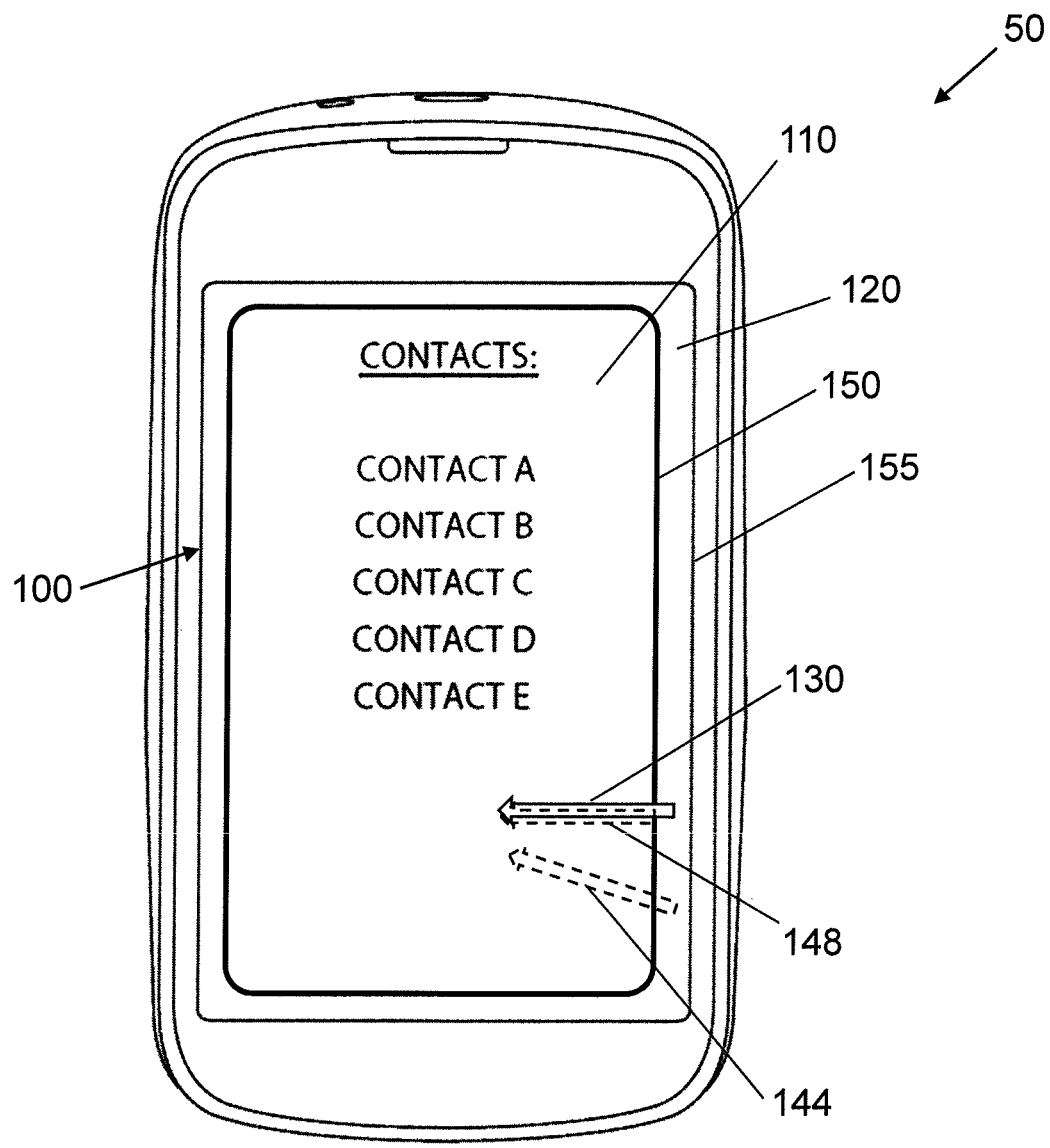
FIG. 6 illustrates detection of a force component and a touch component of user input according to an example embodiment of the present invention.

Because the position of the force component is calculated based on the relative detected force component at each of the force sensors 140, the position of the force component that is determined may not coincide exactly with the position of the touch component that is detected (e.g., with respect to the second portion of the user input, which is within the touch sensitive area). In other words, turning to FIG. 6, the determined position of the force component of the second component user input 130 (shown via a dashed arrow 144) may be off from the determined position of the touch component of the user input (shown via a dashed arrow 148) in the touch sensitive area 110, with the determined position of the touch component 148 being more accurate with respect to the actual position of the user input 130.

Once the position of the force component of the first portion 132 (FIG. 4A) of the user input 130 and the position of the touch component and the force component of the second portion 134 (FIG. 4A) of the user input 130 are determined, the position of the force component and the position of the touch component of the second portion 134 of the user input (e.g., in the touch sensitive area) may be correlated with the position of the force component of the first portion 132 of the user input to determine a position of the touch component of the first portion of the user input. In other words, using the positional information obtained through the detection of the force component both within the touch sensitive area 110 and outside the touch sensitive area (e.g., in the boundary area 120), the position of the touch component outside the touch sensitive area may be determined. For example, the position of the force component of the first portion may indicate that the first portion 132 of the user input was received at a location on the touch screen display 100 that is between an edge 150 of the touch sensitive area and an edge 155 of the touch screen display. Using this in formation, the position of the touch component that is determined within the touch sensitive area 110 for the second portion of the user input 130 may be extrapolated to yield the position of the touch component of the first portion of the user input 130.

Figure 7:
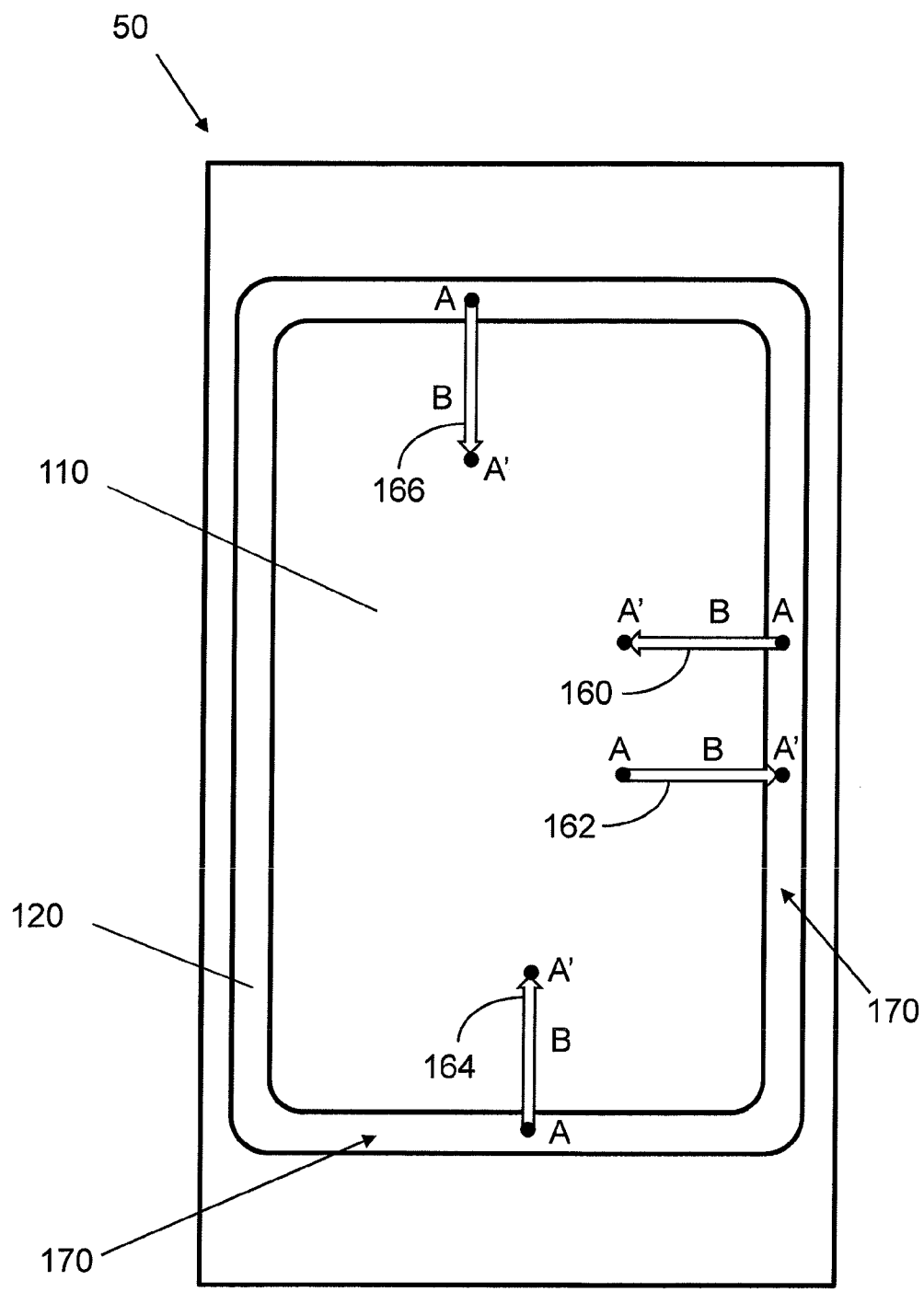
FIG. 7 illustrates various "swipe" gestures applied to a touch surface according to an example embodiment of the present invention.

Execution of an operation may thus be provided for based on at least the position of the touch component of the first portion of the user input that is determined. For example, with reference to FIG. 7, in some cases the device may be configured to receive and execute certain operations in response to a user input, such as a stroke 130, that comprises a touch component having an initial position A that is outside the touch sensitive area 110 (e.g., in the boundary area 120) and a terminal position A' that is within the touch sensitive area 110. The stroke 130 may be, for example, a "swipe-in" gesture 160, a "swipe-up" gesture 164, or a "swipe-down" gesture 166, depending on which edge 170 of the boundary area 120 receives the initial position A of the touch component, the direction of the movement component B, and the terminal position A' of the touch component. In other cases, certain operations may be executed in response to a user input for which the initial position A of the touch component is received within the touch sensitive area 110 and the terminal position A' is outside the touch sensitive area (e.g., in the boundary area 120), such as a "swipe-out" gesture 162.

Figure 8A:
FIGS. 8A-8D illustrate screens representing various types of interactive content according to an example embodiment of the present invention.
Figure 8B:
Figure 8C:
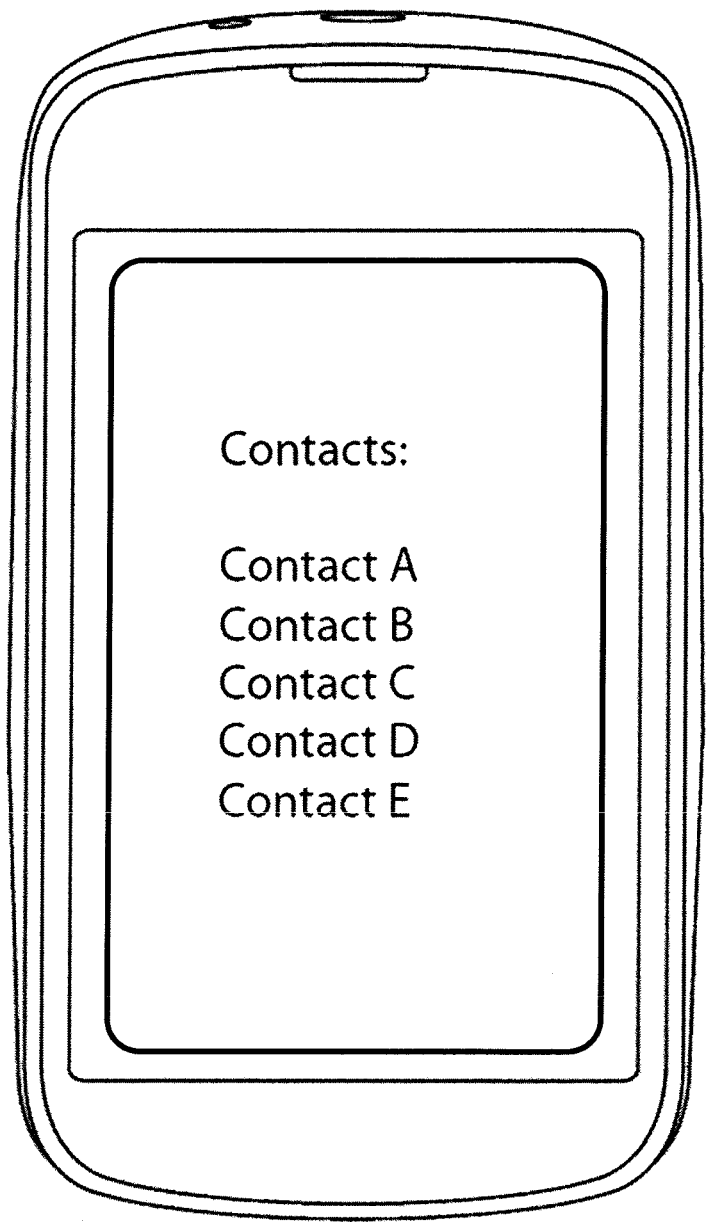

In this regard, a "swipe-in" gesture 160 may invoke the execution of a predetermined operation, such as a transition from a first screen comprising a first interactive content to a second screen comprising a second interactive content. The first screen may be, for example, a lock screen, such as the screen depicted in FIG. 8A. Receipt of a "swipe-in" gesture 160 may cause a transition from the lock screen of FIG. 8A to a home screen as shown in FIG. 8B, from which any of a number of programs may be launched by the user through selection of the corresponding program icon. Similarly, receipt of a "swipe-out" gesture 162 may invoke the execution of a different predetermined operation. For example, if a "swipe-out" gesture 162 is received while the user has a particular program open and displayed in the active display area (such as a program that displays the user's Contacts as shown in FIG. 8C), the "swipe-out" gesture may serve to close the program and transition from display of the program to display of the home screen of FIG. 8B. As additional examples, a "swipe-up" gesture 164 may cause a transition from a first screen of interactive content, such as the home screen of FIG. 8B, to a screen from a particular program, such as the Contacts screen of FIG. 8C, and a "swipe-down" gesture 166 may cause certain content to be displayed overlaying at least a portion of the previously displayed content, such as causing a list of the user's Reminders or appointments to be displayed in at least a portion of the display, at least partially obscuring whatever content was previously being displayed.

Thus, as noted above and described through the examples, based (at least in part) on the position of the touch component (e.g., the initial position of the touch component and/or the terminal position of the touch component) of the user input, the apparatus may be caused to provide for execution of a particular operation. For example, receipt of a particular user input may cause a transition from a screen representing a first interactive content to a screen representing a second interactive content. As used herein, the term "interactive content" refers to information presented to the user via the display 28 (FIG. 2), either graphical (such as using icons, photos, illustrations, etc.) or textual, with which the user may interact in a particular way for a particular purpose. For example, as shown in the example depicted in FIG. 8A, the first interactive content may include information that is presented to the user as part of an idle or lock screen, such as the current time, the day of the week, the date, and a background image. The first interactive content may be configured such that the user can only interact with the content in a very limited manner, such as by shifting the content over to one side using a "swipe-in"

gesture to change the state of the apparatus from idle to active (e.g. to access a home screen). Thus, the purpose of the first interactive content may be to provide certain information to the user (e.g., providing time and date information to the user) and to guard against the accidental entry of user input, such as through the user's incidental and unintentional contact with the display.

Continuing this example, the second interactive content may include data such as a contact list or a list of programs that may be launched by the user (e.g., the home screen shown in FIG. 8B). The second interactive content may be configured such that the user can more fully interact with the content, such as by selecting an icon to launch a program, expanding a displayed item to access details or further information, modify device settings, etc. Thus, the purpose of the second interactive content in this case may be to receive input from the user and to execute certain operations based on the input received.

Accordingly, in some cases, the first interactive content may comprise different information than the second interactive content. The second interactive content may, for example, include additional information as compared to the first interactive content, such as icons for launching a program to play music, an indication of battery life, and an indication of the current weather, etc.

Alternatively or additionally, the first interactive content may be configured to allow the user to interact with the first interactive content according to a first set of rules, and the second interactive content may be configured to allow the user to interact with the second interactive content according to a second set of rules. With reference to the lock screen of FIG. 8A, for example, the first screen may be configured such that only a "swipe-in" gesture is registered as an input that causes a second screen to be accessed and displayed. Other inputs that do not satisfy these criteria, such as a simple touch, multi-touch, pinch, tap, press, or long press (among others) would not be recognized as inputs and would be disregarded by the apparatus. Similarly, the second screen (e.g., the screen of FIG. 8B) may be configured such that only touch events received at certain locations (e.g., corresponding to the location of a particular program icon) of the touch screen display are registered as inputs. Moreover, the operation executed upon receipt of the input may depend on the location at which the touch event is received (e.g., which program to open). Thus, a touch event in a blank area of the screen, for example, where no icon is displayed may not cause any operation to be executed.

As described above and depicted in the figures, the particular arrangement and presentation of interactive content (whether the same or different interactive content) is described herein as being provided via "screens" that are displayed to the user upon the display 28 of the apparatus. In other words, each screen presents to the user a collection of content elements that make up the respective interactive content. In FIG. 8A, for example, the displayed time (10:49) is a content element of the displayed screen and is part of the represented interactive content.

Figure 8D:

Although the examples described above make reference to a transition from a first screen of first interactive content to a second screen of second interactive content, in some cases, depending on the user input, a second screen may be accessed that does not contain different interactive content with respect to the first screen. For example, a user input received entirely within the touch sensitive area 110 may cause a transition between a screen displaying the user's list of Contacts (such as shown in FIG. 8C) and a screen displaying details of a particular Contact (such as shown in FIG. 8D). In this example, the transition would be between a first screen displaying a first interactive content to a second screen displaying content related to the first interactive content, in that the content from both screens was generated by, for example, the same program (e.g., a contacts application).

Figure 9:
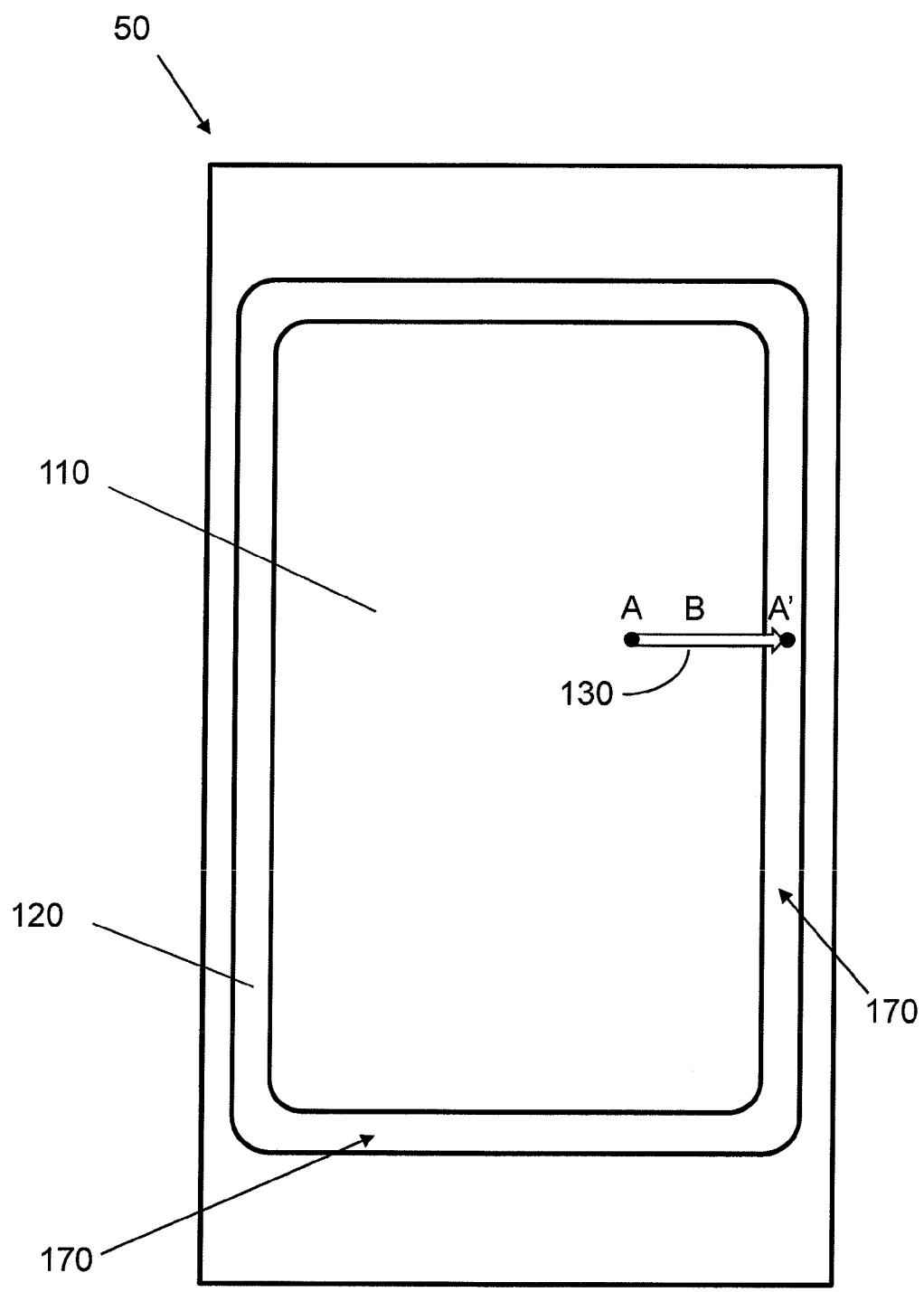
FIG. 9 illustrates a user input for which an initial position of the touch component is received within a touch sensitive area and a terminal position of the touch component is received outside the touch sensitive area according to an example embodiment of the present invention.

Referring to FIG. 9, in some cases, an initial position A of the touch component of the user input 130 may be within the touch sensitive area 110, and a terminal position A' of the touch component of the user input may be outside the touch sensitive area (e.g., in a boundary area 120). In this case, an operation may be executed that is different from the operation executed a corresponding user input having an initial position A of the touch component outside the touch sensitive area and a terminal position A' within the touch sensitive area (e.g., "swipe-in" gesture 160). For example, whereas the "swipe-in" gesture 160 of FIG. 7 may cause a transition from a first screen to a second screen, the reverse gesture (FIG. 9) may cause a transition from the second screen back to the first screen or may close the application.

In cases in which the touch surface 68 (FIG. 2) receiving inputs is a touch screen display 100, as provided in the examples described above, the touch sensitive area 110 may be an active display area in which content is displayed to the user. As noted above, the area outside the touch sensitive area 110 may be a boundary area 120, which may be adjacent to and surrounding the active display area 110. In some cases, the boundary area 120 may be visually distinct from the active display area 110. For example, the boundary area 120 may be configured such that no content is displayed in the boundary area and may thus appear "dark" or "dead." In other cases, however, content that is displayed in the boundary area 120 may have a different appearance than content displayed in the active display area 110. For example, content displayed in the boundary area 120 may appear faded or partially obscured. In still other embodiments, the active display area may extend into the area outside the touch sensitive area.

In some embodiments, the at least one memory and the computer program code may be configured to, with the processor, cause the apparatus to determine a position of the touch component and the force component along an entire length of the second portion 134 of the user input 130 (FIG. 4A). In other cases, only some parts of the second portion 134 of the user input 130 may be applied to areas of the touch screen display that are touch sensitive. For example, the touch sensitive area 110 may be configured such that the mechanism for sensing the touch component of the user input 130 is not continuous across the entire area of the touch sensitive area, and thus only certain points along the second portion 134 of the user input may be sensed with respect to the touch component.

Moreover, in some cases, the user input 130 may include a third portion 136 that is at least partially received within the touch sensitive area or that is at least partially received outside the touch sensitive area. For example, with reference to FIG. 10, an initial position A of the touch component may be in a right hand edge 170 of the boundary area 120, with the first portion 132 of the user input 130 being outside the touch sensitive area. The user input 130 may pass through the touch sensitive area 110 (e.g., the second portion 134 may be within the touch sensitive area), and the user input may continue into a top edge 170 of the boundary area, such that a third portion 136 proximate the terminal position A' of the user input is received outside the touch sensitive area, in this example. In other cases, not shown, the first portion may be received within the touch sensitive area; the second portion may be outside the touch sensitive area; and the third portion may be within the touch sensitive area. Regardless, for each portion that is received outside the touch sensitive area 110, embodiments of the invention may determine the position of the corresponding touch components by correlating position information from detection of the force component with position information relating to the touch component detected within the touch sensitive area, as described above.

In still other embodiments, the at least one memory and the computer program code may be configured to, with the processor, cause the apparatus to provide for execution of the operation (e.g., one of the operations described above) based on the absence of detection of the portion of the touch component of the first portion 132 of the user input 130. For example, detection of a force component of the first portion 132 of the user input 130 without a corresponding detection of the touch component of the same portion of the user input may itself serve as an indication that the first portion of the user input was received outside the touch sensitive area 110. Thus, in situations in which the operation to be executed relies only on the first portion 132 being received outside the touch sensitive area (and not necessarily on which edge 170 of the boundary area 120 received the first portion), the absence of detection of the touch component may cause a predetermined operation to be executed. In other cases, the absence of detection may trigger the correlation of the positional information (for force components and touch components) such that the position of the touch component of the portion of the user input received outside the touch sensitive area may be determined.

FIG. 11 illustrates flowcharts of systems, methods, and computer program products according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, one embodiment of a method for determining the position of a touch component of user input received outside a touch sensitive area, as shown in FIG. 11, includes receiving a user input comprising a touch component and a force component at Block 200. As described above, a first portion of the user input may be at least partially received outside a touch sensitive area, and a second portion of the user input may be at least partially received within the touch sensitive area. The method may further include determining a position of the force component of the first portion of the user input at Block 210 and determining a position of the touch component and the force component of the second portion of the user input at Block 220. The position of the force component and the position of the touch component of the second portion of the user input may then be correlated with the position of the force component of the first portion of the user input to determine a position of the touch component of the first portion of the user input at Block 230. The method may further include providing for execution of an operation based on at least the position of the touch component of the first portion of the user input that is determined at Block 240.

In some cases, as described above, an initial position of the touch component of the user input may be outside the touch sensitive area, and a terminal position of the touch component of the user input may be within the touch sensitive area. In other cases, the initial position of the touch component of the user input may be within the touch sensitive area, and the terminal position of the touch component of the user input may be outside the touch sensitive area. Moreover, in embodiments in which the touch surface receiving the inputs is a touch screen display, the touch sensitive area may correspond to an active display area.

Determining a position of the touch component and the force component of the second portion of the user input may, in some cases, comprise determining a position of the touch component and the force component along an entire length of the second portion of the user input. In addition or alternatively, the user input may include a third portion that is at least partially received within the touch sensitive area or outside the touch sensitive area, as described above. In some cases, the method may further include providing for execution of the operation based on detection of the position of the force component of the first portion of the user input and based on the absence of detection of the position of the touch component of the first portion of the user input.

In some embodiments, certain ones of the operations above may be modified or further amplified as described below. Furthermore, in some embodiments, additional optional operations may be included. Modifications, additions, or amplifications to the operations above may be performed in any order and in any combination.

In an example embodiment, an apparatus for performing the method of FIG. 11 above may comprise a processor (e.g., the processor 70 of FIG. 2) configured to perform some or each of the operations (200-240) described above. The processor may, for example, be configured to perform the operations (200-240) by performing hardware implemented logical functions, executing stored instructions, or executing algorithms for performing each of the operations. Alternatively, the apparatus may comprise means for performing each of the operations described above. In this regard, according to an example embodiment, examples of means for performing at least portions of operation 200 may comprise, for example, the user interface transceiver 72, the processor 70, and/or a device or circuit for executing instructions or executing an algorithm for processing information as described above. Examples of means for performing operations 210-230 may comprise, for example, the processor 70, the memory device 76, and/or a device or circuit for executing instructions or executing an algorithm for processing information as described above. Examples of means for performing operation 240 may comprise, for example, the user interface transceiver 72, the processor 70, the memory device 76, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:
   receive a user input comprising a touch component and a force component, wherein a first portion of the user input is at least partially received outside a touch sensitive area and wherein a second portion of the user input is at least partially received within the touch sensitive area;
   determine a position of the force component of the first portion of the user input;
   determine a position of the touch component of the second portion of the user input and a position of the force component of the second portion of the user input;
   calculate a position of the touch component of the first portion of the user input by extrapolating the position of the touch component of the second portion of the user input based on the position of the force component of the first portion of the user input and the position of the force component of the second portion of the user input, wherein the position of the force component of the first portion and the position of the force component of the second portion are generally collinear and the position of the touch component of the first portion is presumed to be generally collinear with the touch component of the second portion;
   and
   provide for execution of an operation based on at least the position of the touch component of the first portion of the user input that is calculated.

2. The apparatus of claim 1, wherein an initial position of the touch component of the user input is outside the touch sensitive area and wherein a terminal position of the touch component of the user input is within the touch sensitive area.

3. The apparatus of claim 1, wherein an initial position of the touch component of the user input is within the touch sensitive area and wherein a terminal position of the touch component of the user input is outside the touch sensitive area.

4. The apparatus of claim 1, wherein the touch sensitive area corresponds to an active display area.

5. The apparatus of claim 1, wherein the at least one memory and the computer program code are configured to, with the processor, cause the apparatus to determine a position of the touch component and the force component along an entire length of the second portion of the user input.

6. The apparatus of claim 1, wherein the at least one memory and the computer program code are further configured to, with the processor, cause the apparatus to provide for execution of the operation based on detection of the position of the force component of the first portion of the user input and based on the absence of detection of the position of the touch component of the first portion of the user input.

7. The apparatus of claim 1, wherein a third portion of the user input is at least partially received within the touch sensitive area or outside the touch sensitive area.

8. A method comprising:
   receiving a user input comprising a touch component and a force component, wherein a first portion of the user input is at least partially received outside a touch sensitive area and wherein a second portion of the user input is at least partially received within the touch sensitive area;
   determining a position of the force component of the first portion of the user input;
   determining a position of the touch component of the second portion of the user input and a position of the force component of the second portion of the user input;
   calculating a position of the touch component of the first portion of the user input by extrapolating the position of the touch component of the second portion of the user input based on the position of the force component of the first portion of the user input and the position of the force component of the second portion of the user input, wherein the position of the force component of the first portion and the position of the force component of the second portion are generally collinear and the position of the touch component of the first portion is presumed to be generally collinear with the touch component of the second portion;
   and
   providing for execution of an operation based on at least the position of the touch component of the first portion of the user input that is calculated.

9. The method of claim 8, wherein an initial position of the touch component of the user input is outside the touch sensitive area and wherein a terminal position of the touch component of the user input is within the touch sensitive area.

10. The method of claim 8, wherein an initial position of the touch component of the user input is within the touch sensitive area and wherein a terminal position of the touch component of the user input is outside the touch sensitive area.

11. The method of claim 8, wherein the touch sensitive area corresponds to an active display area.

12. The method of claim 8, wherein determining a position of the touch component and the force component of the second portion of the user input comprises determining a position of the touch component and the force component along an entire length of the second portion of the user input.

13. The method of claim 8 further comprising providing for execution of the operation based on detection of the position of the force component of the first portion of the user input and based on the absence of detection of the position of the touch component of the first portion of the user input.

14. The method of claim 8, wherein a third portion of the user input is at least partially received within the touch sensitive area or outside the touch sensitive area.

15. A computer program product comprising at least one computer-readable storage medium having computer-executable program code portions stored therein, the computer-executable program code portions comprising program code instructions for:
   receiving a user input comprising a touch component and a force component, wherein a first portion of the user input is at least partially received outside a touch sensitive area and wherein a second portion of the user input is at least partially received within the touch sensitive area;
   determining a position of the force component of the first portion of the user input;
   determining a position of the touch component of the second portion of the user input and a position of the force component of the second portion of the user input;
   calculating a position of the touch component of the first portion of the user input by extrapolating the position of the touch component of the second portion of the user input based on the position of the force component of the first portion of the user input and the position of the force component of the second portion of the user input, wherein the position of the force component of the first portion and the position of the force component of the second portion are generally collinear and the position of the touch component of the first portion is resumed to be generally collinear with the touch component of the second portion;
   and
   providing for execution of an operation based on at least the position of the touch component of the first portion of the user input that is calculated.

16. The computer program product of claim 15, wherein an initial position of the touch component of the user input is outside the touch sensitive area and wherein a terminal position of the touch component of the user input is within the touch sensitive area.

17. The computer program product of claim 15, wherein an initial position of the touch component of the user input is within the touch sensitive area and wherein a terminal position of the touch component of the user input is outside the touch sensitive area.

18. The computer program product of claim 15, wherein the touch sensitive area corresponds to an active display area.

19. The computer program product of claim 15, wherein determining a position of the touch component and the force component of the second portion of the user input comprises determining a position of the touch component and the force component along an entire length of the second portion of the user input.

20. The computer program product of claim 15 further comprising program code instructions for providing for execution of the operation based on detection of the position of the force component of the first portion of the user input and based on the absence of detection of the position of the touch component of the first portion of the user input.

21. The computer program product of claim 15, wherein a third portion of the user input is at least partially received within the touch sensitive area or outside the touch sensitive area.

* * * * *

UNITED STATES PATENT AND TRADEMARK OFFICE
CERTIFICATE OF CORRECTION

PATENT NO. : 8,890,825 B2  Page 1 of 1
APPLICATION NO. : 13/400440
DATED : November 18, 2014
INVENTOR(S) : Bose et al.

It is certified that error appears in the above-identified patent and that said Letters Patent is hereby corrected as shown below:

In The Specification

<u>Column 21,</u>
Line 30, "resumed" should read --presumed--.

Signed and Sealed this
Thirtieth Day of June, 2015

Michelle K. Lee
*Director of the United States Patent and Trademark Office*